(12) United States Patent
Gu et al.

(10) Patent No.: US 8,264,165 B2
(45) Date of Patent: Sep. 11, 2012

(54) METHOD AND SYSTEM FOR DIMMING AN OFFLINE LED DRIVER

(75) Inventors: Wei Gu, San Jose, CA (US); Zhizheng Liu, Fremont, CA (US)

(73) Assignee: Linear Technology Corporation, Milpitas, CA (US)

( * ) Notice: Subject to any disclaimer, the term of this patent is extended or adjusted under 35 U.S.C. 154(b) by 583 days.

(21) Appl. No.: 12/495,170

(22) Filed: Jun. 30, 2009

(65) Prior Publication Data

US 2010/0327773 A1    Dec. 30, 2010

(51) Int. Cl.
H05B 37/02    (2006.01)
(52) U.S. Cl. ............ 315/291; 315/209 R; 315/246
(58) Field of Classification Search ............ 315/291, 315/224, 225, 246, 247, 209 R, 209 SC, 307
See application file for complete search history.

(56) References Cited

U.S. PATENT DOCUMENTS

| 6,870,327 B2 * | 3/2005 | Takahashi et al. ............ 315/248 |
| 2006/0132061 A1 | 6/2006 | McCormick et al. |
| 2008/0258647 A1 * | 10/2008 | Scianna ............ 315/291 |
| 2010/0013409 A1 * | 1/2010 | Quek et al. ............ 315/294 |
| 2010/0207536 A1 * | 8/2010 | Burdalski et al. ............ 315/224 |

FOREIGN PATENT DOCUMENTS

| DE | 10 2005 018 795 A1 | 10/2006 |
| GB | 2 435 724 A | 9/2007 |
| WO | WO 2005/115058 A1 | 12/2005 |
| WO | WO 2008/029108 A1 | 3/2008 |

OTHER PUBLICATIONS

European Search Report issued in European Patent Application No. EP 10006723.0 dated Oct. 18, 2010.

* cited by examiner

*Primary Examiner* — James H Cho
(74) *Attorney, Agent, or Firm* — McDermott Will & Emery LLP (57) ABSTRACT

An apparatus and method for dimming a light emitting diode (LED) driver. The apparatus includes a triode alternating current (TRIAC) dimmer and an LED driver receiving an input voltage from an output of the TRIAC dimmer so that the state of the LED driver is controlled by the TRIAC dimmer. The LED driver includes an active damping circuit configured for damping, upon detecting a rising edge of a bridge rectified input voltage, resonance caused by the TRIAC dimmer and the LED driver for a fixed period of time.

17 Claims, 7 Drawing Sheets

Fixed Pulse

Fig. 6(b)

Smaller R1   Larger R1

MOSFET Gate Voltage

Fig. 7

METHOD AND SYSTEM FOR DIMMING AN OFFLINE LED DRIVER

BACKGROUND

1. Technical Field

The present teaching relates to method and system for analog circuit. More specifically, the present teaching relates to method and system for light emitting diode (LED) driver and circuits and systems incorporating the same.

2. Discussion of Technical Background

The usage of lighting devices in modern society is ubiquitous. Such lighting devices consume electricity. To save consumption of electricity, there have been various attempts to develop either lighting devices that consumes less electricity or control devices that can be used to adjust the brightness of the lighting, hence the level of usage of electricity, based on need. For example, LED lights has been developed that consumes much less electricity compared with other conventional lights. In addition, dimming devices have also been developed that can be operated to dynamically adjust the level of brightness. For instance, lighting in a bedroom of a home can be dimmed at night to save energy. However, dimming devices available today in the market place do not work well with LED lights due to the existence of resonance in an LED driver so that the dimming feature can become more of the problem rather than the solution.

For example, a triode alternating current (TRIAC) dimmer is a well known technology. However, a TRIAC dimmer requires a minimum holding current after being triggered. If the current drops below this level or becomes negative, the TRIAC dimmer will be turned off. The resonant nature of the input filter of a typical LED driver and the line inductance can easily lead to the reversal of the line current, which causes the TRIAC to lose conduction shortly after triggering of the TRIAC. In such situations, the TRIAC dimmer can enter into a chaotic operation state and the result is that the light is simply flickering rather than being dimmed.

Figure 1:
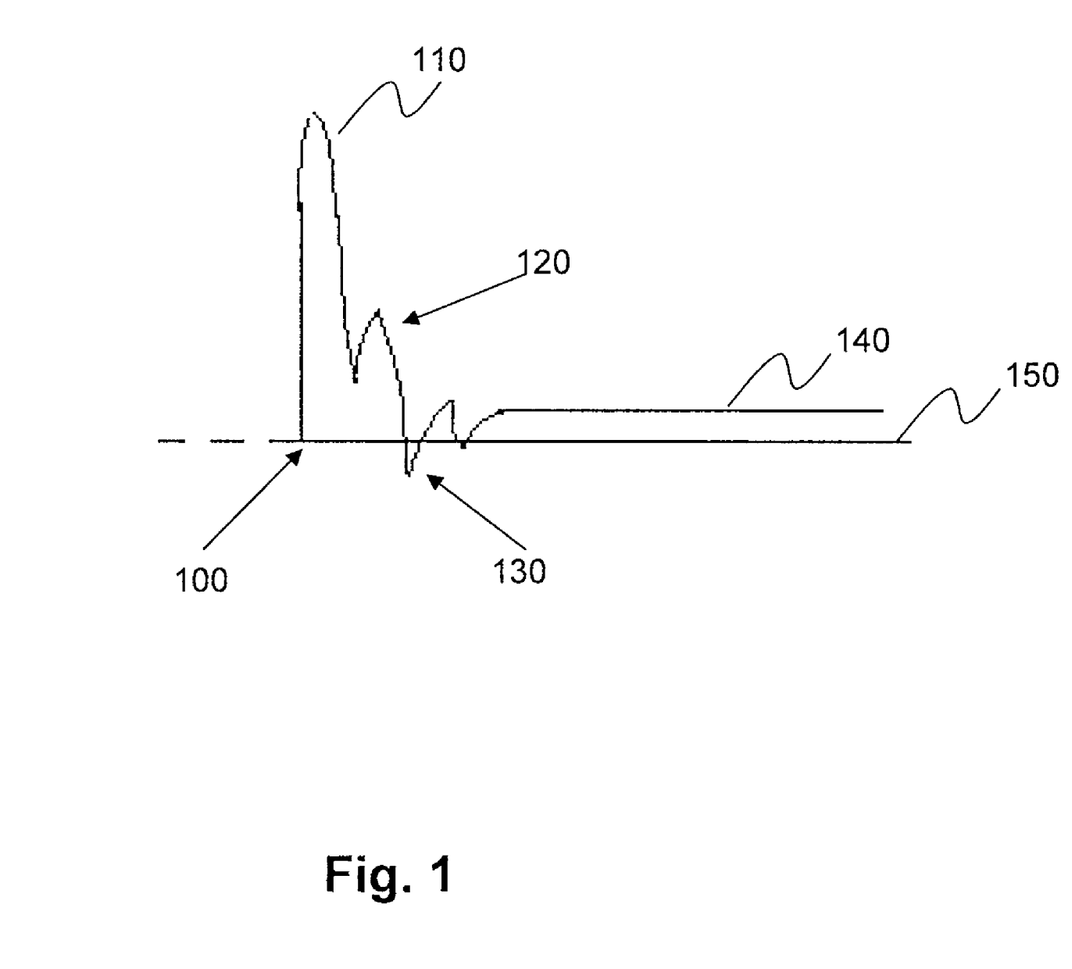
FIG. 1 illustrates a phenomenon in which a TRIAC dimmer can be temporarily turned off due to the existence of resonance.

FIG. 1 shows a typical TRIAC current waveform, which leads to the situation in which a TRIAC dimmer can be temporarily turned off when the TRIAC current goes below a minimally required level 150 due to the existence of resonance. As illustrated, when a TRIAC dimmer is triggered (turned on) at 100, the TRIAC current reaches a high level at 110. Before the TRIAC current eventually becomes stable shown at 140, the TRIAC current can fluctuate, due to resonance, e.g., to lower levels shown at 120 and 130. At 130, the TRIAC current level becomes lower than the minimally required level 150, and the TRIAC dimmer will be turned off until the TRIAC current goes back to a level higher than the threshold 150.

Figure 2:
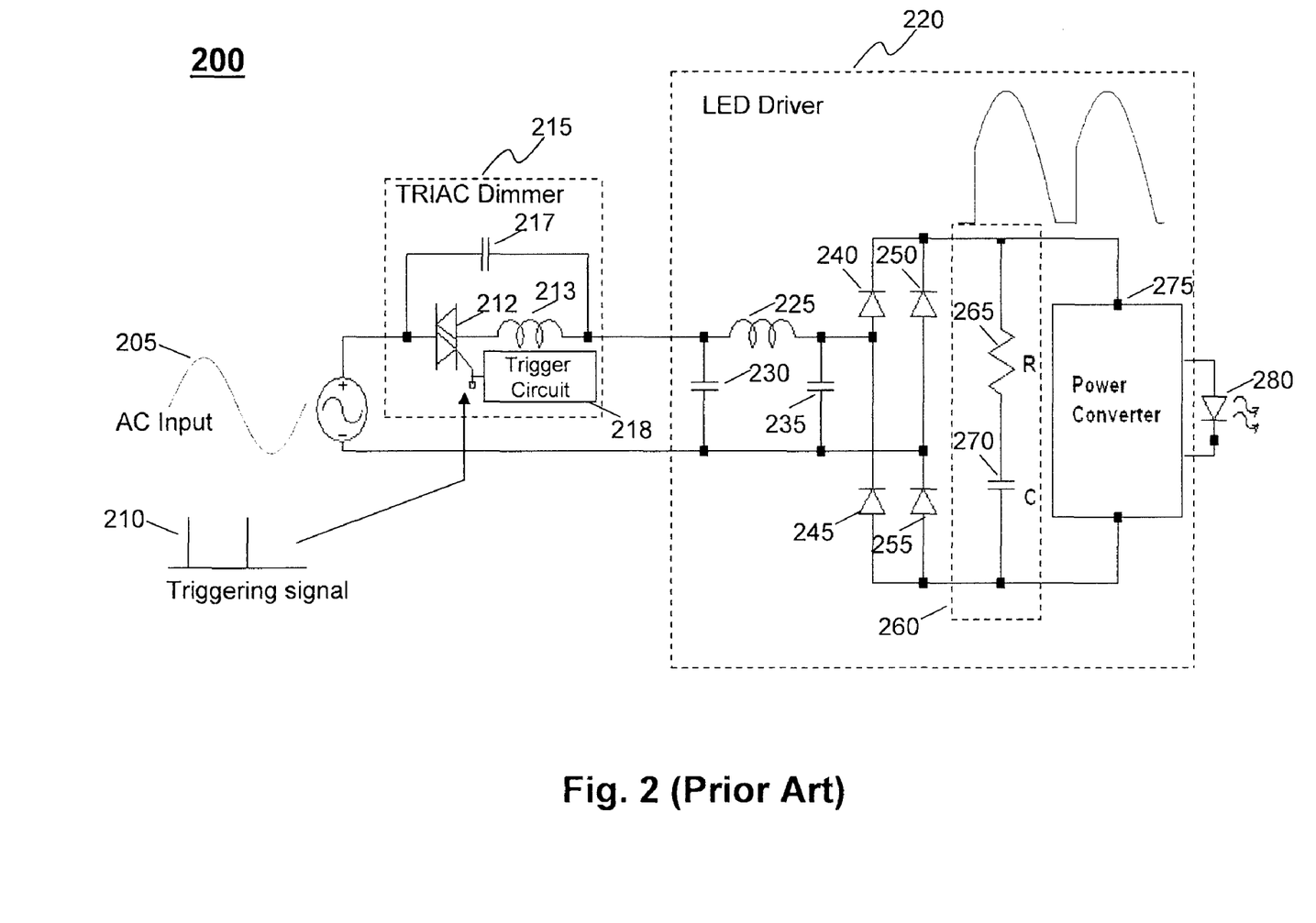
FIG. 2 (Prior Art) shows a conventional solution to prevent a TRIAC dimmer from being temporarily turned off.

One typical conventional solution to this problem is to introduce a damping circuit, e.g., an RC-type or RCD-type of passive damping circuit to the resonant tank, to prevent the line current from going negative. FIG. 2 (Prior Art) shows such an RC-type damping circuit 260 employed in an LED circuit 220 to damp the existing resonance so as to prevent a TRIAC dimmer 215 from being temporarily turned off. This conventional solution includes a TRIAC dimmer 215 (212, 213, 217, and 218), which takes an AC input 205 and generates, by the trigger circuit 218, a triggering signal 210. The TRIAC dimmer 220 is connected with an LED driver 220 which is controlled by the TRIAC dimmer 220. The LED driver 220 comprises an input filter (225, 230, 235), a bridge rectifier (240, 245, 250, 255), a passive damping circuit 260 (including 265 and 270), a power converter 275, and a diode 280 that converts the output current to light.

There are a number of drawbacks associated with the passive damping circuit shown in FIG. 2 (Prior Art). This solution causes high power dissipation on the damping circuit itself, resulting in lower efficiency and a shorter lifetime due to higher temperature on the LED driver. Another drawback is that the capacitor 270 in the RC or RCD damping circuit 260 distorts the sinusoidal shape of the input current in a power factor correction (PFC) LED driver, thus, lowering the power factor.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

Figure 3:
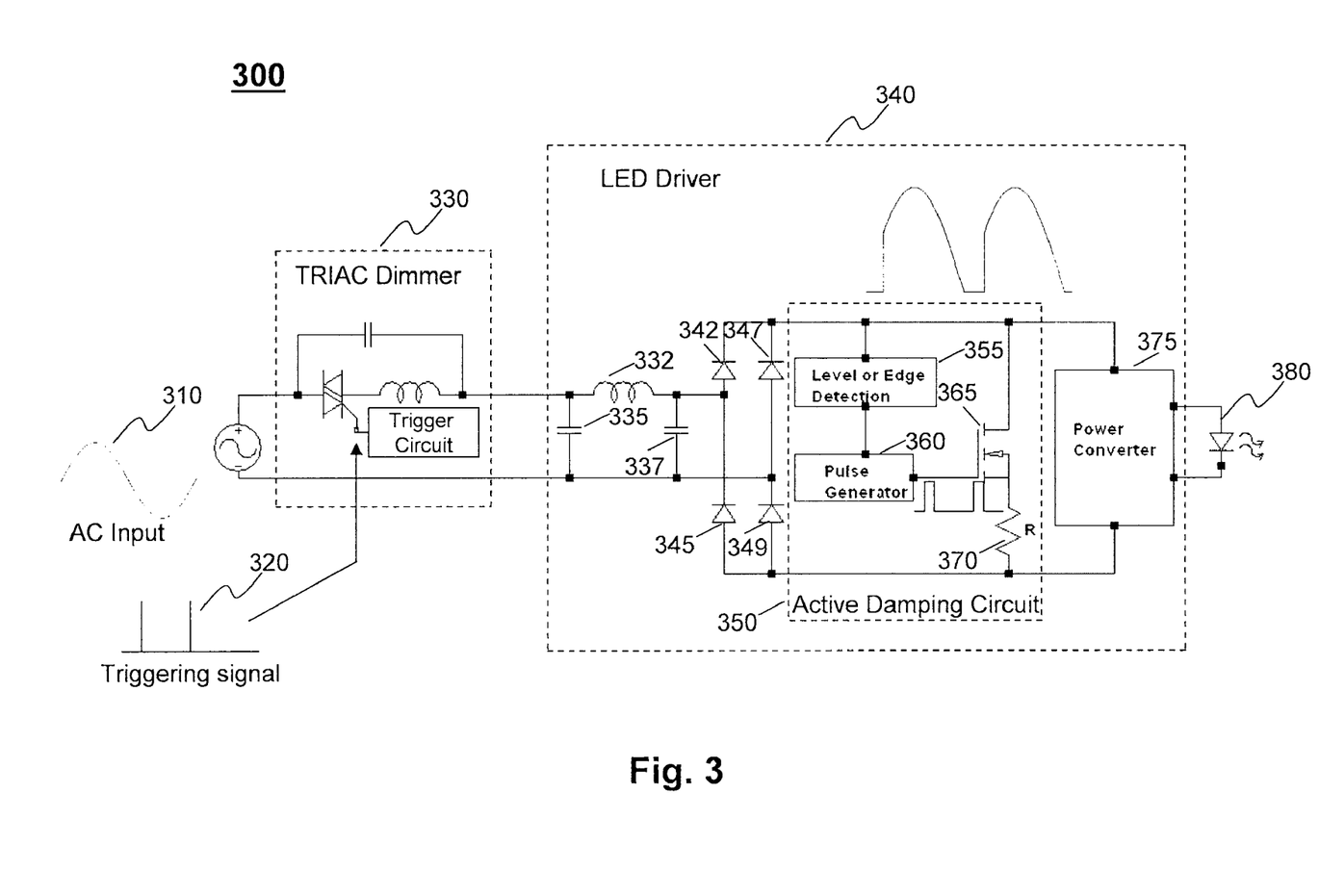
FIG. 3 depicts a circuit for TRIAC dimming of an LED driver, according to an embodiment of the present teaching.

The present teaching relates to apparatus and method for reliable TRIAC dimming an LED driver. FIG. 3 depicts a circuit 300 for TRIAC dimming of an LED driver, according to an embodiment of the present teaching. This illustrated embodiment comprises a TRIAC dimmer 330 and an LED driver 340. Similar to FIG. 2, the TRIAC dimmer 330 takes an AC source 310 and generates a triggering signal 320. The output of the TRIAC dimmer 330 is fed to the LED driver 340 as input. In this embodiment, the LED driver 340 comprises some similar components as shown in FIG. 2 such as an input filter (332, 335, 337), a bridge rectifier (342, 345, 347, 349), and a power converter 375. The LED driver 340 also includes an active damping circuit 350 that, although connecting to the bridge rectifier and the power converter in the same manner as in FIG. 2, operates differently compared with the passive damping circuit 260 in FIG. 2.

The active damping circuit 350 is designed to damp the resonance in an active manner. The active damping circuit 350 is turned on only when a rising edge of the input voltage from the bridge rectifier is detected and, once being turned on, remains activated only for a very short period of time to damp the resonance rapidly. This results in a minimum power loss as well as minimum input current distortion. To accomplish that, the active damping circuit 350 includes a level/edge detection circuit 355, a pulse generator 360, and a damping circuit including a transistor 365 and a resistor 370, connected as shown in FIG. 3.

When the TRIAC dimmer is triggered, the input voltage of the LED driver (which is the output of the TRIAC dimmer) jumps up. It is commonly known that when an input voltage is high, it is likely the resonance is higher. Therefore, to overcome the negative impact of resonance in the circuit, it may be preferred to damp the resonance when the input voltage is high. The active damping circuit 350 is designed to detect when the input voltage becomes high. This is performed by the level/edge detection circuit 355. For example, the level/edge detection circuit 355 may detect the rising edge of the input voltage when the voltage reaches a certain level.

There are different manners in which the rising edge can be detected. In some embodiments, the level/edge detection circuit 355 may simply detect the level of the input voltage. To increase the reliability of the detection, a differential circuit may also be deployed for the same purpose. In some embodiments, detection based on derivatives of the input voltage over time may also be employed.

Upon detecting the rising edge, the level/edge detection circuit 355 sends a signal to the pulse generator 360, which generates pulses to be used to turn on a controlled current source, made of a MOSFET transistor 365 and resistor 370. The on state of the transistor 365 is for a period of time, controlled by the width of the pulses generated by the pulse generator 360. By turning on the MOSFET transistor 365, it effectively damps the resonance caused by the TRIAC dimmer 330 and the LED driver 340, preventing the line current from going negative. The current of the controlled current source is calculated as $I=(V_{gate}-V_{TH})/R$,
here Vgate is the MOSFET gate voltage and $V_{TH}$ is the MOSFET gate threshold voltage.

To handle different levels of resonance, the level of the controlled current flowing through the MOSFET transistor 365 may be adjusted by adjusting the resistance level of resistor 370. The higher the resonance, the smaller the value of the resistance. The lower the resonance, the larger the value of the resistance.

Figure 4A:
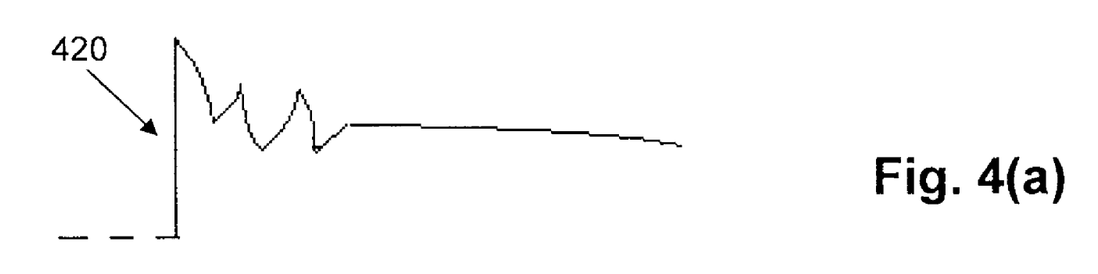
FIGS. 4(a)-4(c) shows the timing diagram of different voltages, resulting from the circuit constructed according to an embodiment of the present teaching.
Figure 4B:
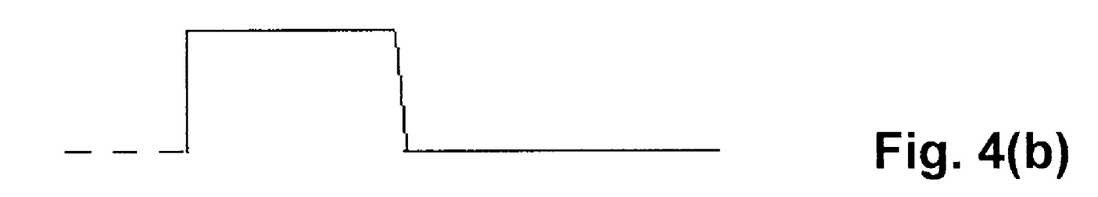
Figure 4C:
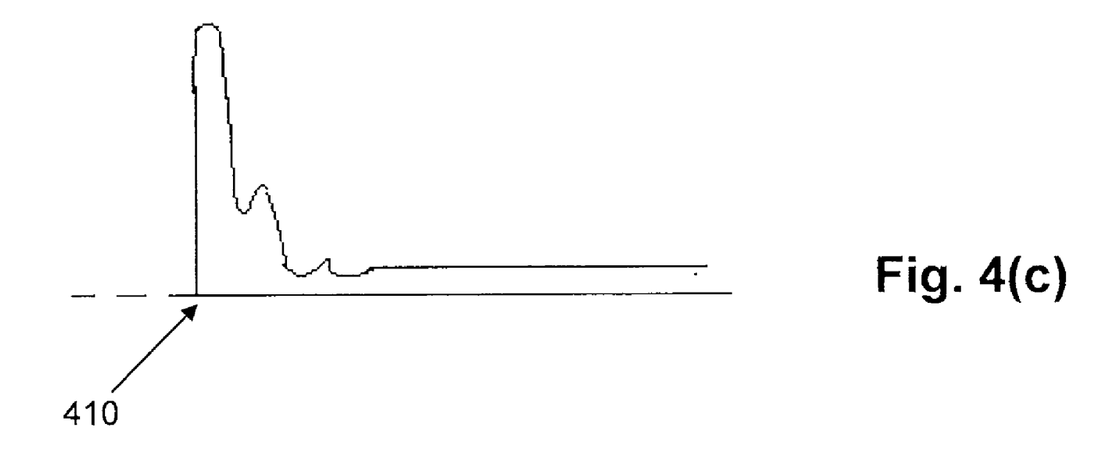

FIGS. 4(a)-4(c) shows different waveforms, resulting from the circuit 300 shown in FIG. 3. In FIG. 4(c), at 410, the TRIAC dimmer 330 is triggered so that its output voltage jumps up at 410. This voltage is fed to the input filter and the bridge rectifier (see FIG. 2). FIG. 4(a) shows the output voltage of the bridge rectifier which is the input to the active damping circuit 350. As can be seen, the input voltage to the active damping circuit 350 has a sharp rising edge at 420, which is detected by the level/edge detection circuit 355. This detected event controls the pulse generator 360 to generate pulses. At the high state of such pulses, the MOSFET transistor 365 is turned on and FIG. 4(b) shows the current (in the controlled current source) that flows through the MOSFET transistor 365, effectively damping the resonance existing in the circuit.

In general, the resonant frequencies of the input filter (332, 335, 337) and the line inductance are usually much higher than the line frequency. Therefore, to effectively damp the resonance, the current source needs to be turned on for only a very short period of time over the line cycle. Because of this, the loss on this active damping circuit can be kept to a minimum. Moreover, because no energy storage component is used (e.g., a capacitor) in the active damping circuit 350, the power factor is not negatively impacted with the addition of the damper to the LED driver.

Figure 5:
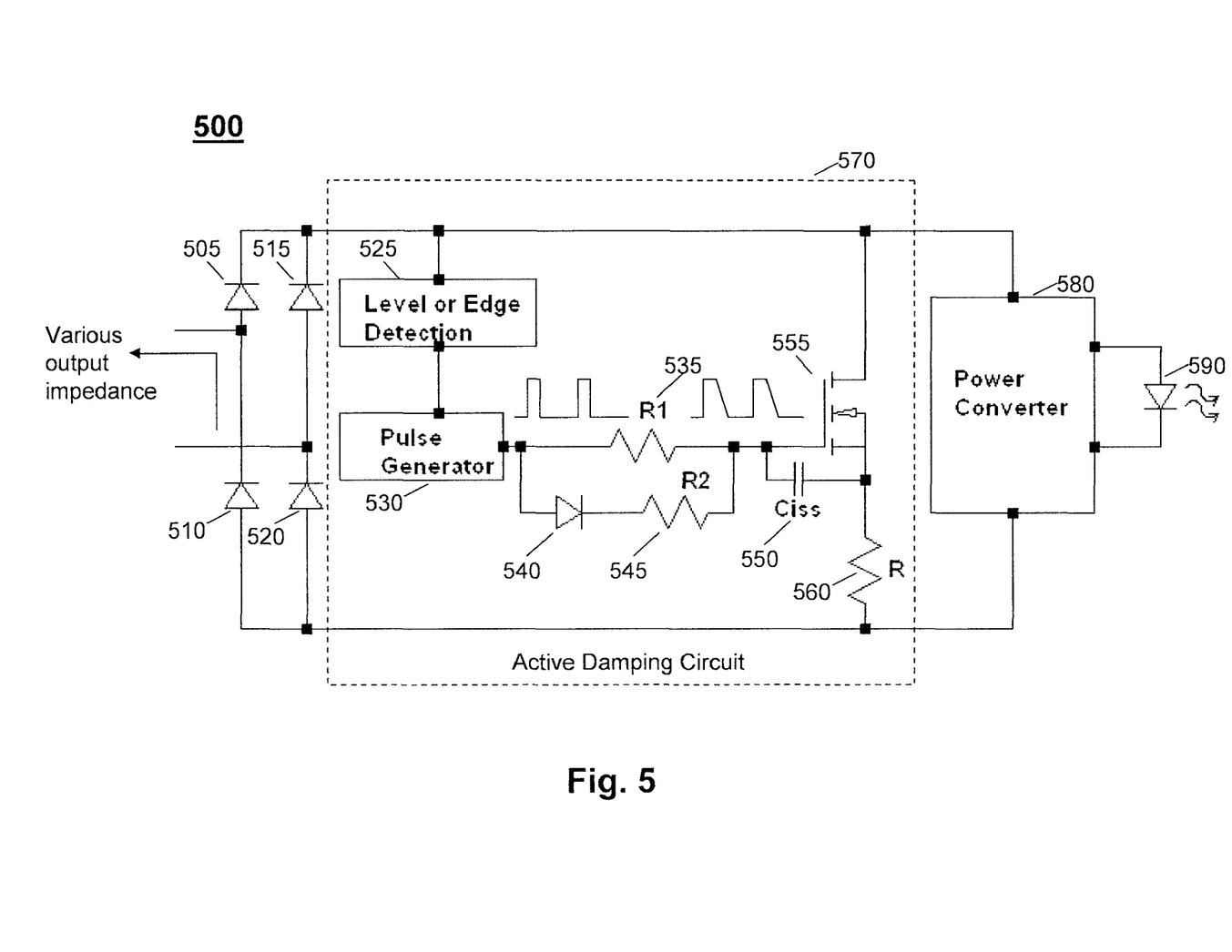
FIG. 5 depicts another circuit for TRIAC dimming of an LED driver, according to an embodiment of the present teaching.

When the line inductance and input filter impedance vary, the amount of resonance may also vary accordingly. Therefore, it is important, in such situations, to make the on-time of the current source or active damping period (e.g., the MOSFET transistor) adjustable to accommodate the variations. FIG. 5 depicts another circuit 500 to be used in TRIAC dimming of an LED driver with an adjustable active damping period, according to an embodiment of the present teaching. An alternative active damping circuit 570 is connected to a part of the LED driver circuit. The active damping circuit 570 is coupled with a bridge rectifier (505, 510, 515, 520) and a power converter 580.

The active damping circuit 570 comprises a level/edge detection circuit 525, a pulse generator 530, and a sub-circuit that has an adjustable damping period. This sub-circuit includes a resistor 535, a diode 540, a resistor 545, a transistor (MOSFET) 555, a capacitor 550, and another resistor 560. Those components are connected as shown in FIG. 5. In operation, when the input voltage from the bridge rectifier becomes high, the level/edge detection circuit 525 detects the rising edge of the input voltage and activates the pulse generator 530 to output pulses of a certain frequency and width. Such pulses pass through resistor 535 to the gate of MOSFET transistor 555. When the pulse is high, the transistor 555 is turned on, damping the resonance in the circuit, as discussed above with respect to FIG. 3.

The voltage of the pulses generated by the pulse generator 530 dictates the amount of current in the controlled current source 555. Although the duration of the on-time period of the pulses is fixed at the pulse generator 530, this duration can be effectively adjusted by slowing down the falling edges of the pulses, as shown in FIG. 5. This can be realized through adjusting the value of resistor 535, effectively increasing the duration of the effective on-time period.

The higher the resistance of resistor 535, the slower the falling edges fall. The lower the resistance of resistor 535, the faster the falling edges fall. This is because the value of resistor 545 can be chosen to be much smaller than that of resistor 535. In this case, when a pulse from the pulse generator 530 is high, the circuit is quickly conducting. Over the parallel connection (resistor 535 is parallel to the serially connected diode 540 and resistor 545), as resistor 545 is much smaller, resistor 535 basically does not play a role and therefore, has no impact on the rising edge. However, when the pulse from the pulse generator is low, diode 540 is not conducting so that resistor 545 does not play a role in the falling edge. Thus, the resistor 535 controls the slope of the falling edge on the gate of the MOSFET transistor.

Figure 6A:
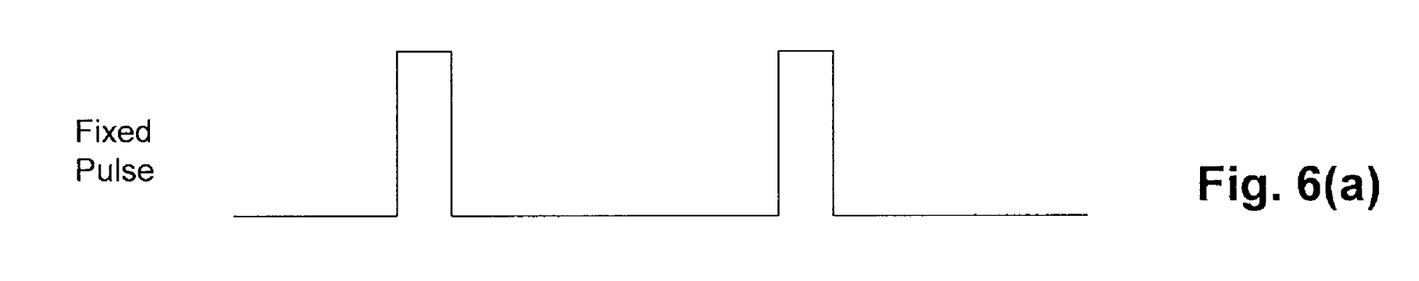
FIGS. 6(a)-6(b) present adjustable pulses that can be used to control the length in time to damp resonance, according to an embodiment of the present teaching.
Figure 6B:
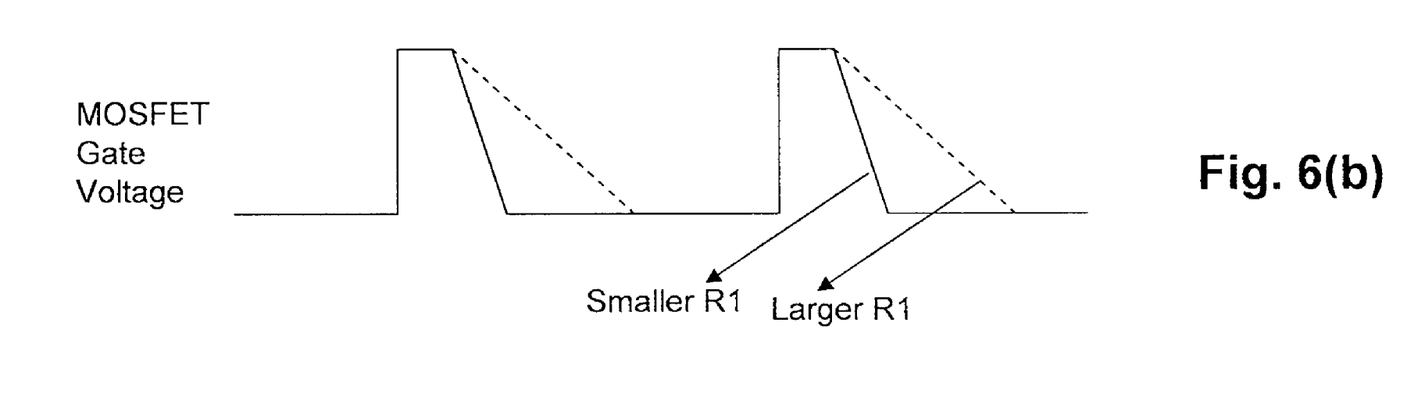

The impact of the value on the slope of the falling edge at the gate of the MOSFET transistor is shown in FIG. 6(a) and FIG. 6(b). The extended time is proportional to the time constant of resistor 535 and the gate capacitance 550 of the MOSFET. From an implementation point of view, this damping circuit can use one dedicated pin to control both the current and the on time.

Figure 7:
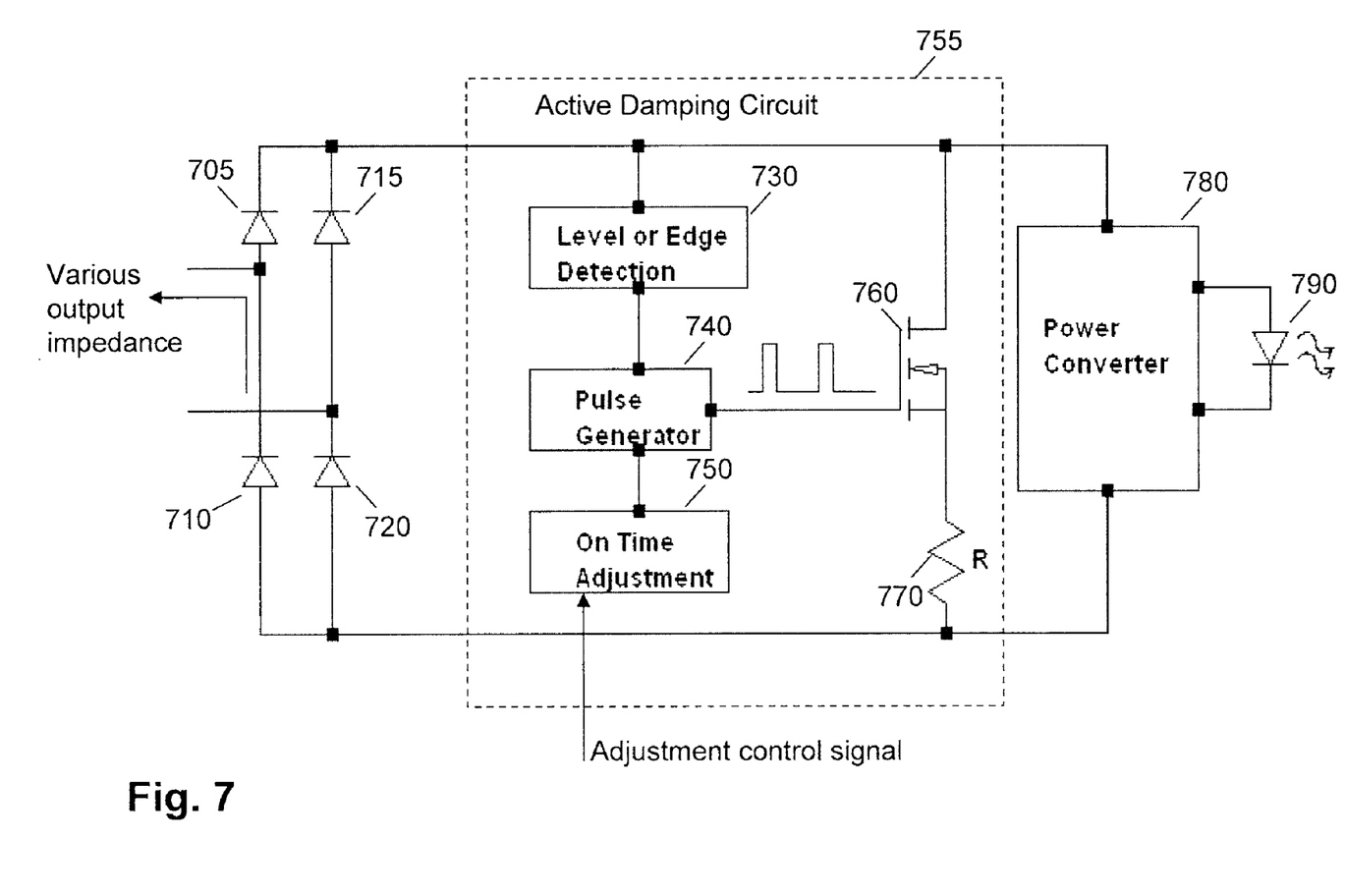
FIG. 7 depicts yet another circuit for TRIAC dimming of an LED driver, according to an embodiment of the present teaching.

FIG. 7 depicts yet another exemplary active damping circuit 755 for TRIAC dimming of an LED driver that can have an adjustable damping duration, according to an embodiment of the present teaching. In this exemplary circuit, the active damping circuit 755 comprises some similar components as shown in FIG. 5, including a level/edge detection circuit 730, a pulse generator 740, a MOSFET transistor 760, and a resistor 770. They are connected in a similar way as in FIG. 3. However, this active damping circuit also includes an on-time adjustment circuit 750, that is connected to the pulse generator 740 to control the width of the pulses generated, which directly corresponds to the on-time of the controlled current source 760.

In this exemplary embodiment, the on-time adjustment circuit 750 is connected to the outside of the chip to receive a control signal that can be used to adjust the width of the pulses generated by the pulse generator 740. A wider pulse results in a longer on-time and a higher level of damping. To implement this embodiment, an additional pin is needed in order to be able to control the on-time adjustment circuit 750.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A system for dimming a light emitting diode (LED) driver, comprising:
    a triode alternating current (TRIAC) dimmer;
    an LED driver receiving an input voltage from an output of the TRIAC dimmer so that the state of the LED driver is controlled by the TRIAC dimmer, wherein
    the LED driver includes an active damping circuit configured for damping, upon detecting a rising edge of a bridge rectified input voltage, resonance caused by the TRIAC dimmer and the LED driver for a fixed period of time.

2. The system according to claim 1, wherein the TRIAC dimmer comprises an inductor, a capacitor, and a TRIAC, wherein the capacitor is coupled to the TRIAC as a first input terminal connected to a positive terminal of an AC source, the TRIAC being connected also to a source of triggering signal to be used to activate the TRIAC dimmer, the inductor being coupled to the capacitor and serially connected to the TRIAC to provide an output of the TRIAC dimmer.

3. The system according to claim 2, wherein the LED driver further comprises:
    an input filter, coupled to the output of the TRIAC dimmer and a negative terminal of the AC source as inputs, configured to generate a filtered output voltage;
    a bridge rectifier, coupled to the filtered output voltage from the input filter and the negative terminal of the AC source as inputs, configured to produce outputs on first and second output terminals; and
    a power converter coupled to the first and second output terminals as power conversion inputs and configured to convert the power conversion inputs to constant output current or voltage as output of the LED driver.

4. The system according to claim 3, wherein the power converter and the active damping circuit are connected to the bridge rectifier in parallel.

5. The system according to claim 1, wherein the active damping circuit comprises:
    a level/edge detector, coupled to the first output terminal of the bridge rectifier to receive the bridge rectified input voltage, configured for detecting the rising edge of the bridge rectified input voltage and for producing an output signal when the detected rising edge exceeds a certain pre-determined level;
    a pulse generator, having its input coupled to the output signal of the edge detector, configured to be activated by the output signal to generate one or more pulses, each of which has a fixed duration;
    a transistor having its gate connected to the output of the pulse generator, its source connected to the bridge rectified input voltage; and
    a resistor having one terminal coupled to the drain of the transistor and the other terminal coupled to the second output terminal of the bridge rectifier.

6. The system according to claim 5, wherein the transistor in the active damping circuit is a MOSFET transistor.

7. A system dimming a light emitting diode (LED) driver, comprising:
    a triode alternating current (TRIAC) dimmer;
    an LED driver receiving as an input voltage an output of the TRIAC dimmer so that the state of the LED driver is controlled by the TRIAC dimmer, wherein
    the LED driver includes an active damping circuit configured for damping, upon detecting a rising edge of a bridge rectified input voltage, resonance caused by the TRIAC dimmer and the LED driver for an adjustable period of time.

8. The system according to claim 7, wherein the LED driver further comprises:
    an input filter, coupled to the output of the TRIAC dimmer and a negative terminal of the AC source as inputs, configured to generate a filtered output voltage;
    a bridge rectifier, coupled to the filtered output voltage from the input filter and the negative terminal of the AC source as inputs, configured to produce outputs on first and second output terminals; and
    a power converter coupled to the first and second output terminals as power conversion inputs and configured to convert the power conversion inputs to constant output current or voltage as output of the LED driver.

9. The system according to claim 8, wherein the active damping circuit comprises:
    a level/edge detector configured for detecting the rising edge of the bridge rectified input voltage received on the first output terminal of the bridge rectifier and producing an output signal when the detected rising edge exceeds a certain pre-determined level;
    a pulse generator, having its input coupled to the output signal of the edge detector, configured to be activated by the output signal to generate one or more pulses each of which has a fixed width;
    a sub-circuit having its first terminal connected to the output of the pulse generator;
    a transistor having its gate connected to a second terminal of the sub-circuit, its source connected to the bridge rectified input voltage;
    a first resistor having its first terminal coupled to the drain of the transistor and the other terminal coupled to the second output terminal of the bridge rectifier; and
    a capacitor connecting the gate and drain of the transistor.

10. The system according to claim 9, wherein the sub-circuit comprises:
    a second resistor having its first terminal connected to the output of the pulse generator and its second terminal connected to the gate of the transistor, where the second resistor is adjustable;
    a diode and a third resistor connected in serial to each other having the negative terminal of the diode connected to the first terminal of the third resistor, wherein
    the serially connected diode and the third resistor are connected in parallel to the second resistor, having the positive terminal of the diode connected to the first terminal of the second resistor and second terminal of the third resistor connected to the second terminal of the second resistor, the resistance of the second resistor can be adjusted to change the falling edge of the pulses at the gate of the transistor so that the period of time in which the resonance is damped can be dynamically adjusted.

11. The system according to claim 10, wherein when the resistance of the second resistor is increased, the length of time to damp the resonance is increased accordingly.

12. The system according to claim 8, wherein the active damping circuit comprises:

a level/edge detector, coupled to the first output terminal of the bridge rectifier to receive the bridge rectified input voltage, configured for detecting the rising edge of the bridge rectified input voltage and producing an output signal when the detected rising edge exceeds a certain pre-determined level;

a pulse generator, having its first input coupled to the output signal of the edge detector, configured to be activated by the output signal to generate one or more pulses, each of which has an adjustable width;

an on-time adjustment circuit having its input connected to an adjustment control signal and configured to generate a control signal forwarded to a second input of the pulse generator to control the width of the one or more pulses;

a transistor having its gate connected to the one or more pulses from the pulse generator, its source connected to the bridge rectified input voltage; and a resistor having one terminal coupled to the drain of the transistor and the other terminal coupled to the second output terminal of the bridge rectifier.

13. The system according to claim 9 or 12, where the transistor is a MOSFET transistor.

14. A method for dimming a light emitting diode (LED) driver, comprising:

providing an output of a triode alternating current (TRIAC) dimmer as an input to an LED driver;

controlling the state of the LED driver based on an input voltage generated by the TRIAC dimmer, wherein the LED driver is capable of actively damping, upon detecting a rising edge of a bridge rectified input voltage, resonance caused by the TRIAC dimmer and the LED driver for a fixed period of time.

15. The method according to claim 14, wherein said actively damping comprises:

detecting a rising edge of a bridge rectified input voltage;

producing an output signal when the detected rising edge exceeds a certain pre-determined level;

generating, upon receiving the output signal, one or more pulses, each of which has a fixed duration;

damping the resonance during a high state of the one or more pulses.

16. The method according to claim 14, wherein said actively damping comprises:

detecting a rising edge of a bridge rectified input voltage;

producing an output signal when the detected rising edge exceeds a certain pre-determined level;

generating, upon receiving the output signal, one or more pulses, each of which has an adjustable falling edge;

adaptively damping the resonance during a rising edge of each of the pulses and before the falling edge of each of the pulses falls below a pre-determined value, wherein the slope of the falling edge of the one or more pulses can be adjusted so as to change the duration in which the resonance is damped.

17. The method according to claim 14, wherein said actively damping comprises:

detecting a rising edge of a bridge rectified input voltage;

producing an output signal when the detected rising edge exceeds a certain pre-determined level;

generating, upon receiving the output signal, one or more pulses, each of which has an adjustable width;

adaptively damping the resonance between a rising edge of each of the pulses and a falling edge of each of the pulses, wherein the width of the one or more pulses can be adjusted so as to change the duration in which the resonance is damped.

* * * * *